United States Patent [19]

Arnold et al.

[11] Patent Number: 4,922,785

[45] Date of Patent: May 8, 1990

[54] TUBULAR CAMSHAFT ASSEMBLIES AND THE LIKE

[75] Inventors: Philip D. Arnold, Bloomfield Hills; Roy G. Kaywood, Stockbridge, both of Mich.

[73] Assignee: General Motors Corporation, Detroit, Mich.

[21] Appl. No.: 211,504

[22] Filed: Jun. 24, 1988

Related U.S. Application Data

[62] Division of Ser. No. 23,320, Mar. 9, 1987.

[51] Int. Cl.$^5$ .................. F16H 53/00; B23P 15/00; B21D 39/00; F01L 1/46

[52] U.S. Cl. ..................... 74/567; 29/523; 29/421.1; 123/90.6; 72/58

[58] Field of Search ............ 74/567, 569, 53, 54, 74/55; 123/90.6, 90.31; 29/523, 421.1, 156.4 R, 522.1; 72/58

[56] References Cited

U.S. PATENT DOCUMENTS

| | | |
|---|---|---|
| 1,390,949 | 9/1921 | Yassenoff ........................ 74/567 |
| 3,869,938 | 3/1975 | Schlotterbeck et al. ............ 74/567 |
| 3,999,277 | 12/1976 | Hamada ........................ 29/523 |
| 4,265,388 | 5/1981 | Takahashi et al. ............... 228/135 |
| 4,293,995 | 10/1981 | Jordan ....................... 29/421.009 |
| 4,382,390 | 5/1983 | Jordan ........................ 74/567 |
| 4,421,137 | 12/1983 | Nusbaumer et al. ............ 29/523 X |
| 4,538,337 | 9/1985 | Holbrook et al. ................ 29/523 |
| 4,575,913 | 3/1986 | Sugiuchi et al. ............... 29/523 X |
| 4,597,365 | 7/1986 | Madaffer ..................... 29/522.1 X |
| 4,660,269 | 4/1987 | Suzuki ........................ 29/523 |
| 4,750,250 | 6/1988 | Maus et al. ................... 74/567 X |
| 4,781,076 | 11/1988 | Hartnett et al. ................ 74/567 |

FOREIGN PATENT DOCUMENTS

| | | |
|---|---|---|
| 408875 | 1/1925 | Fed. Rep. of Germany . |
| 2336241 | 2/1975 | Fed. Rep. of Germany . |
| 3303629 | 9/1983 | Fed. Rep. of Germany ........ 29/523 |
| 3401057 | 7/1984 | Fed. Rep. of Germany . |
| 3431361 | 3/1986 | Fed. Rep. of Germany ..... 29/156.4 R |
| 552028 | 1/1923 | France . |
| 46-7644 | 2/1971 | Japan .......................... 29/523 |
| 46-21299 | 6/1971 | Japan . |
| 0149655 | 9/1982 | Japan . |
| 0070105 | 4/1985 | Japan ......................... 29/156.4 R |
| 729989 | 5/1955 | United Kingdom . |
| 1117816 | 6/1968 | United Kingdom . |
| 2050207 | 1/1981 | United Kingdom . |

OTHER PUBLICATIONS

Shaw, F. W., "Dwell Cams of Uniform Diameter", Mechanical World, Oct. 4, 1935, pp. 329–330.
Sandford James, "Nonround Connections Strength Mechanical Drives", reprint from Design News, Sep. 22, 1975 (2 pages).

*Primary Examiner*—Vinh Luong
*Attorney, Agent, or Firm*—Robert J. Outland

[57] ABSTRACT

Camshaft assemblies are disclosed with methods for making them by the expansion of tubular shafts into prelocated cams, journals and other elements, if desired. Features of the camshafts include trilobe or polylobe element openings, preferably splined or serrated for low energy filling and high torque capacity and High Strength Low Alloy mild steel tubular shaft material.

26 Claims, 2 Drawing Sheets

TUBULAR CAMSHAFT ASSEMBLIES AND THE LIKE

CROSS REFERENCES

This is a division of abandoned U.S. patent application Ser. No. 023,320 filed Mar. 9, 1987 which is also the parent of copending continuing application Ser. No. 211,178 and divisional application Ser. No. 211,505 both also filed June 24, 1988.

TECHNICAL FIELD

This invention relates to camshafts for internal combustion engines and the like. In particular, the invention relates to assembled camshafts.

BACKGROUND

U.S. Pat. No. 4,597,365, issued July 1, 1986 to the assignee of the present invention, discloses a camshaft assembly and method involving retention of cam and journal elements on a hollow shaft by expansion of the shaft into engagement with preshaped openings of the elements. Various other camshaft assemblies and methods are also shown by the prior art. While certain of these arrangements provide benefits in economy and structure, further economies are desirable for making the most efficient use of this technology.

SUMMARY OF THE INVENTION

The present invention provides improved camshaft assemblies, manufacturing procedures and equipment which yield benefits in both structural soundness and economy of manufacture for assembled camshafts, particularly of the type described in the noted U.S. Pat. No. 4,597,365, the disclosure of which is incorporated herein by reference.

An improved camshaft according to the invention includes the use of nonround element openings comprising so called curved polygons of preferably uniform apparent diameter and having odd numbers of slightly eccentric lobes. These configurations minimize the energy required for their filling by expansion of the associated hollow shaft while providing a joint of high torque capacity. The addition of one or more small grooves or splines on the ends of the lobes further improves the torque capacity. By use of preferred materials for the shaft, the torsional strength relative to the expansion energy required may be further improved.

These and other features and advantages of the invention will be more fully understood from the following description of certain embodiments of the invention taken together with the accompanying drawings.

BRIEF DRAWING DESCRIPTION

DETAILED DESCRIPTION

Figure 1:
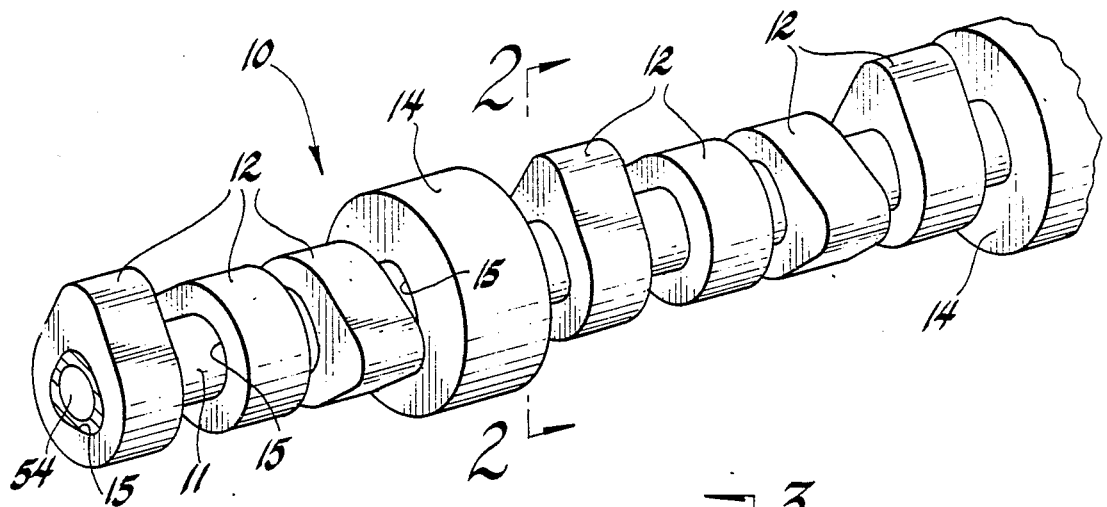
FIG. 1 is a pictorial view of a portion of an internal combustion engine camshaft assembly formed in accordance with the invention.

Referring now to the drawings in detail, numeral 10 generally indicates part of a finished camshaft assembly formed in accordance with the invention. Camshaft 10 includes a hollow supporting tube or shaft 11 which which has been expanded in a manner to be subsequently described.

While the shaft may be made of ordinary low carbon steel as noted in U.S. Pat. No. 4,597,365, we prefer to make the shaft 11 of a mild steel of High Strength Low Alloy specification such as SAE 1022 HSLA. The steel tubing used to make the shaft may be of a type which is electric resistance welded and drawn over a mandrel, having a yield strength of 45,000–55,000 psi.

Fixedly positioned on the tube 11 are a plurality of cam elements 12 and journal elements 14. Additional elements such as gears, eccentrics or sprockets could also be included if desired. The elements 12, 14 are longitudinally spaced and the cam elements 12 are angularly oriented in predetermined positions for actuating valve gear in an internal combustion engine or the like. The cam elements 12 are preferably forged and hardened, either fully or on their wearing surfaces, and the journal elements 14 may be similarly formed or, if desired and their operation permits, may be formed of non-hardened material.

The forged, or otherwise formed, cam and journal elements are provided with tube or shaft receiving openings 15, which are axially aligned in assembly and are preferably non-circular to positively lock onto the shaft when it is expanded into the openings. We have found that a preferred shape or configuration for the openings is that of a so-called curved polygon of preferably uniform, or essentially uniform, apparent diameter. Such curved polygons may be made with any odd number of lobes, however we prefer to use and have obtained good results using a configuration, which we call a trilobe, having three eccentric lobes 16.

Minimal eccentricity is required and preferred for high torque capacity with a minimum of expansion energy. An eccentricity of only five thousandths of an inch (0.005 in. difference in radial height between the lobes and adjacent valleys) gives good results although greater eccentricities can be used if desired.

Figure 4:
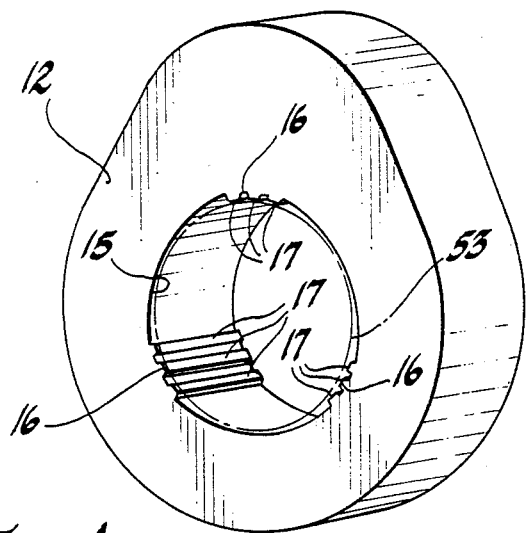
FIG. 4 is a pictorial view of a separate cam element prior to assembly and having a trilobe opening according to the invention with inwardly splined lobes.

To further increase the torque capacity, the addition of one or more small serrations or splines 17, preferably at the ends of the lobes, is also desirable. We have found effective the addition of nine inwardly protruding and longitudinally extending splines 17. These splines are preferably arranged in closely spaced groups of three at the end of each of the lobes 16 of the openings 15. The splines protrude inwardly only about 0.005 inches, or approximately equal to the preferred trilobe eccentricity. The addition of these splines was found to increase the breakaway torque for the shaft mounted trilobe elements about 20–25 percent. FIG. 4 illustrates a cam element 12 prior to assembly and having the preferred nine splined trilobe opening previously described. Obviously, in this and the previous views, the eccentricity of the opening is grossly exaggerated for clarity of illustration as it would be almost unnoticeable if drawn in its true configuration.

Figure 5:
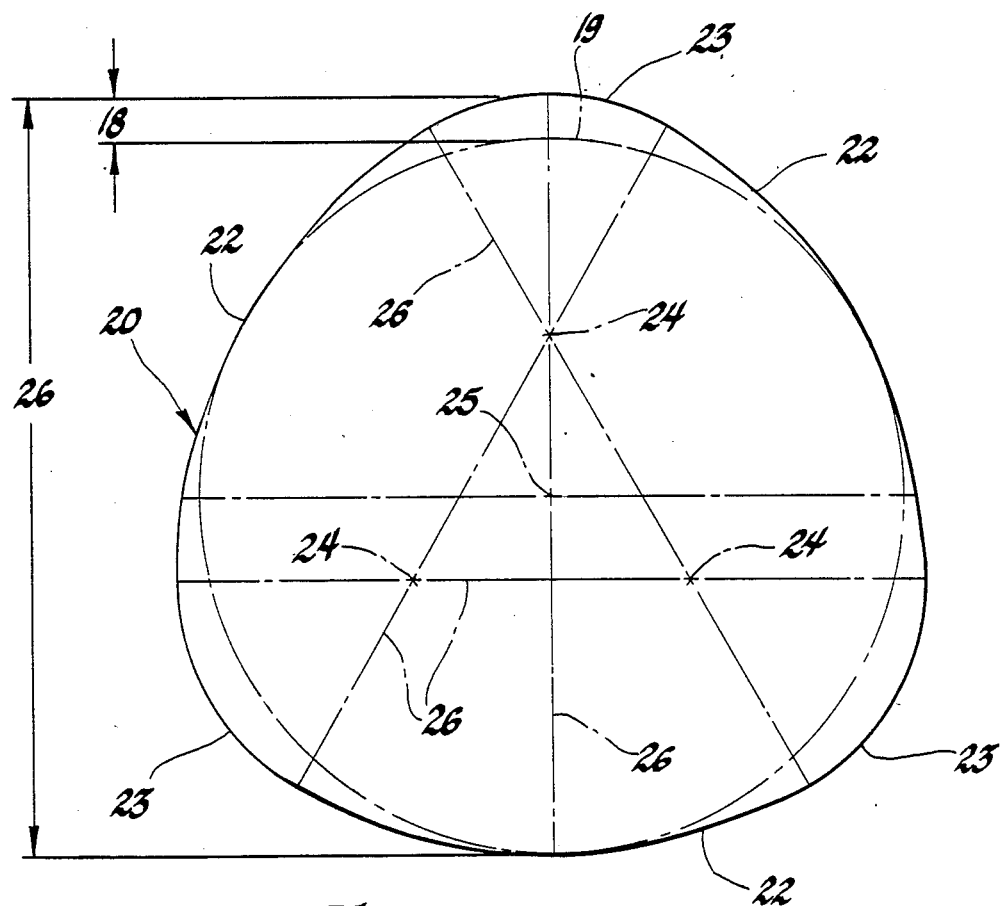
FIG. 5 is a graphical presentation of the development of a trilobe configuration having uniform apparent diameters according to the invention.

In FIG. 5, a graphical illustration of the development of a trilobe figure is presented having an eccentricity 18 measured from a circle 19 defining the minimum radius of the trilobe perimeter 20. The developed perimeter 20 is made up of blended tangent swing radii in the form of a series of joined alternating outwardly convex long arcs 22 and short arcs 23 of varying radii which are drawn from three equally spaced centers 24 spaced about the true center 25 of the figure. The result is that the perimeter has an overall uniform height or width 26 as measured in any angular direction or position. For clarity, this uniform or constant dimension is herein referred to as the "apparent diameter" 26, since it represents the maximum width (or the length of the longest chord) in any angular position or direction of measurement. It should be understood that, as the position of measurement of this uniform or constant apparent diameter is angularly rotated or advanced through 360 degrees, the apparent diameter dimension passes sequentially through each of the three centers 24 and only coincides with the true diameter passing through the true center 25 when the apparent diameter is measured at the midpoints of any two opposing long and short arcs 22, 23.

ASSEMBLY APPARATUS

For details of an assembly apparatus for making camshafts according to the invention, see our cross referenced copending application Ser. No. 211,505, the disclosure of which is incorporated herein by reference.

ASSEMBLY METHOD

The manufacture of a camshaft assembly in accordance with the invention is in many ways similar to that described in the noted U.S. Pat. No. 4,597,365, although including significant differences in the following preferred steps:

(1) The elements, such as cams and journals, a gear, eccentric and sprocket or the like, are made with, or provided with, the preformed shaft openings 15 and are formed to relatively close, but normally unfinished, dimensions. In accordance with the invention, the openings are preferably nonround curved polygons of minimal eccentricity, preferably trilobes having one or more inwardly projecting splines 17 at the lobe ends. Additionally, grooves or serrations extending outwardly from or into the trilobe surface, or other variations, may be used.

The trilobe or other odd lobed curved polygon shape requires lower energy for filling by tube expansion while giving high breakaway torques. Displacement of material from the valleys into the adjacent lobes with a minimum of expansion due to the preferred constant apparent diameter, or height, of the polygon eccentric perimeter is believed to be an advantage of this configuration that leads to the lower energy requirement.

Figure 2:
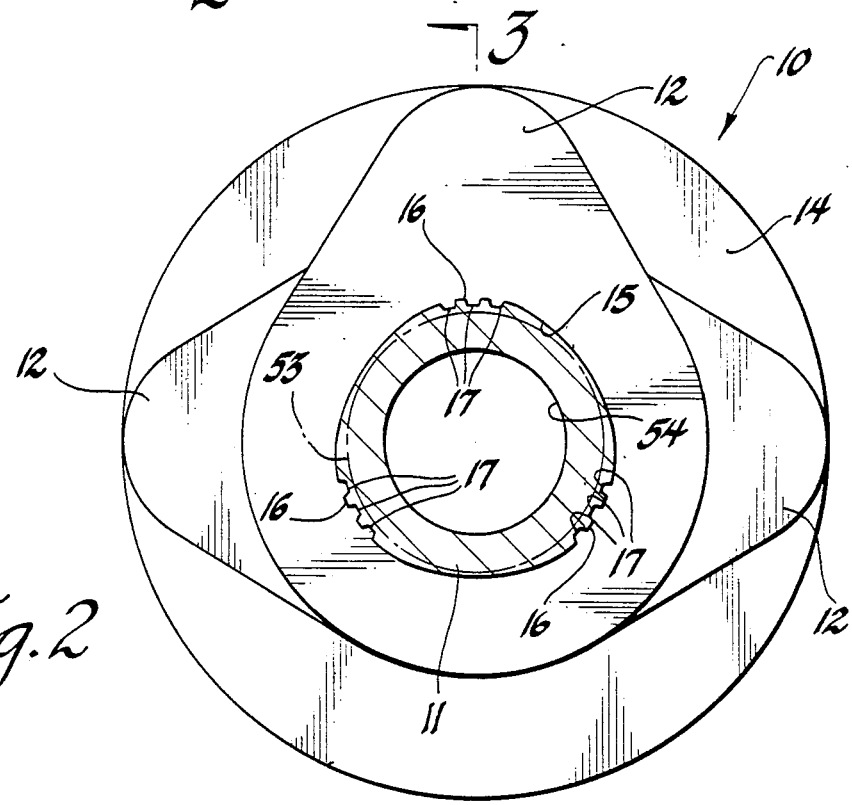
FIG. 2 is a transverse cross-sectional view of a portion of the camshaft assembly from the plane indicated by the line 2—2 of FIG. 1.

(2) A tubular shaft 11 is provided, preferably made of high strength low alloy mild steel such as SAE 1022 HSLA. The tube may be of the resistance welded type, sized by drawing over a mandrel and having a yield strength of 45,000-55,000 psi. This low yield strength combines with significant work hardening after yielding to provide low expansion energy with significantly higher breakaway torques after assembly than other materials. The shaft outer diameter is circular and sized to fit closely but freely within the eccentric shaft openings 15 of the elements 12, 14, etc. The dashed line 53 in FIGS. 2 and 4 represents the shaft outer diameter beforel expansion. Camshafts have been made with shafts of ¾, ⅞ and 1 inch outer diameters but other sizes including larger and smaller diameters could be utilized if desired.

(3) The cam, journal and other elements, if any, are positioned in a fixture, such as fixture 27 of the said application Ser. No. 211,505 with their openings 15 aligned on a common axis. The fixture may be similar to, but preferably differs from, that described in the noted U.S. Pat. No. 4,597,365 in various ways, including the construction of the locators and spacers and the addition of the locating and gaging means and the shaft end loading means previously described.

(4) The fixture is closed, holding the elements in position and the shaft is inserted into the openings 15 in a predetermined longitudinal position. The shaft ends are then loaded by hydraulic, mechanical or other force applying means with a force sufficient to prevent substantial longitudinal growth of the shaft during the subsequent steps.

(5) The shaft is expanded in any suitable manner. We prefer mechanical expansion by a ball 48 forced through the tube or shaft 11 from one end, called the front end 44, to the other, called the rear end 43. With this process, sometimes known as ballizing, a uniformly sized smooth interior 54 is formed within the tube.

Figure 3:
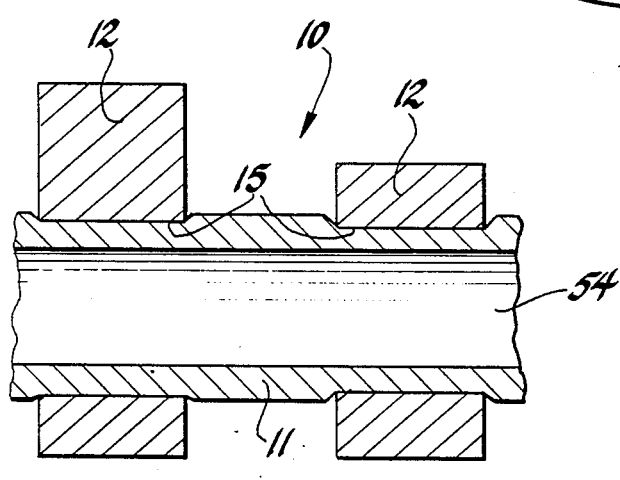
FIG. 3 is a longitudinal cross-sectional view of a portion of the camshaft assembly from the plane indicated by the line 3—3 of FIG. 2.

The ball is preferably large enough to expand the tube into full engagement with the element openings 15 and radially beyond the openings between the elements, as is shown clearly in FIG. 3, so that the elements are permanently fixed in their established positions, both angularly and longitudinally. In an embodiment wherein the initial clearance between the trilobe openings 15 and the shaft 11 before expansion was 0.008 inches on the diameter and the trilobe eccentricity was the preferred 0.005 inches, the use of a ball 48, oversize by 0.035 inches relative to the initial inner diameter of the shaft 11, provided the desired results with a minimum amount of expansion energy required relative to the high level of breakaway torque obtained for the assembled cam elements.

However, in some cases greater trilobe eccentricities may be desirable as, for example, when wide journal or cam elements are used and more volume for displacement of the expanded shaft material is required to avoid excessive longitudinal carryover of the displaced material. Trilobe openings with from 0.005 to 0.020 inch eccentricity have been tested but other dimensions could also be used as desired.

As has been indicated previously, minimal eccentricity of the lobed openings is proposed for obtaining a high torque capacity joint with a minimum expenditure of shaft expansion energy. Since the present work has concentrated on eccentricities of less than 3.0 percent of the apparent diameter of the trilobe openings, this value is deemed to represent a maximum limit for the term minimal eccentricity as used in describing the shapes of the lobed openings in the specification and claims. Based upon results of the foregoing tests, it is presently preferred that the eccentricity of the trilobe openings be maintained within about 0.4-1.5 percent of their apparent diameter, or of the diameter of the associated shaft which is only a few thousandths of an inch smaller. An eccentricity of about 0.5 percent of the opening apparent diameter (0.005 inches with a one inch diameter shaft) is most preferred at present as it appears to provide adequate torsional strength with relatively low energy requirements for expansion of the tubular shaft.

(6) After expansion of the shaft, the end loading of the shaft is released by backing off the force applying means. The assembled camshaft is then removed from the fixture for other finishing steps, if any, which may be required, such as hardening of the cams if they are not prehardened, grinding of the cams and journals, etc.

The force of the end loading of the shaft should be sufficient to prevent significant longitudinal growth of the shaft 11 during ballizing. This causes all the growth to be radial and provides the preferred complete filling of the trilobe openings 15 and the further expansion of the shaft material radially beyond the openings 15 in the spaces located longitudinally between the elements 12, 14, etc. In addition, the end loading prevents the elements from being locked against the spacers by lengthwise growth of the shaft during ballizing and, thus, after release of the end loading, allows easy removal of the assembled camshaft 10 from the fixture. Bending and other damage which might otherwise result from forced removal are thereby avoided.

ADVANTAGES

From the foregoing description of certain preferred embodiments of an improved camshaft assembly, together with assembly apparatus and assembly methods, it is seen that the various features of the invention provide numerous advantages including:
- accurate axial location of cam, journal and other elements on the shaft;
- high breakaway torques with minimal thrust energy for forcing the ball through the tubular shaft by reason of improved splined trilobe or other curved polygon shaped openings, improved shaft material selection, and end loading the shaft to prevent axial growth; and
- prevention of axial growth through end loading during assembly.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. A camshaft assembly for internal combustion engines and the like, said assembly comprising a plurality of cam elements each including a nonround axial opening having an odd number of regularly spaced lobes of less than 3.0 percent eccentricity and primarily defined by joined outwardly convex arc of varying radii, said elements being secured in predetermined fixed orientation said spacing, with said openings axially aligned, on a hollow tube expanded into interference engagement with all the element openings.

2. A camshaft assembly as in claim 1 wherein said openings as primarily defined are formed with a substantially constant apparent diameter dimension at all angular positions.

3. A camshaft assembly as in claim 2 wherein said shaft is made from a high strength low alloy specification mild steel having a relatively low yield point but which is subject to substantial work hardening after yielding.

4. A camshaft assembly as in claim 1 wherein said openings as primarily defined are trilobed and formed with a substantially constant apparent diameter dimension at all angular positions.

5. A camshaft assembly as in claim 4 wherein the periphery of each of said openings as primarily defined has an eccentricity of from 0.4–1.5 percent of said apparent diameter of the opening.

6. A camshaft assembly as in claim 5 wherein said eccentricity is substantially 0.5 percent.

7. A camshaft assembly as in claim 4 wherein said lobes include at their ends at least one longitudinal serration of minimal radial extent, said tube being expanded into intimate contact with said at least one serration.

8. A camshaft assembly as in claim 7 wherein the periphery of each of said openings as primarily defined has an eccentricity of from 0.4–1.5 percent of said apparent diameter of the opening.

9. A camshaft assembly as in claim 8 wherein said eccentricity is substantially 0.5 percent.

10. A camshaft assembly as in claim 9 wherein said shaft is made from a high strength low alloy specification mild steel having a relatively low yield point but which is subject to substantial work hardening after yielding.

11. A camshaft assembly for internal combustion engines and the like, said assembly comprising a plurality of cam elements each including a nonround axial opening having an odd number of regularly spaced lobes of minimal eccentricity and secured in predetermined fixed orientation and spacing, with said openings axially aligned, on a hollow tube expanded into interference engagement with all the element openings, wherein said lobes include at their ends at least one longitudinal serration of minimal radial extent, said tube being expanded into intimate contact with said at least one serration.

12. A camshaft assembly as in claim 11 wherein said serration extends radially inward from the periphery of its lobe.

13. A camshaft assembly for internal combustion engines and the like, said assembly comprising a plurality of cam elements each including a nonround axial opening having an odd number of regularly spaced lobes of less than 3.0 percent eccentricity and primarily defined by joined outwardly convex arcs of varying radii, said elements being secured in predetermined fixed orientation and spacing, with said openings axially aligned, on a hollow tube mechanically expanded into interference engagement with all the element openings while forming within the tube a uniform smooth sided interior cross-sectional configuration and having portions of the tube exterior between the elements expanded diametrically beyond the element openings to secure the elements permanently onto the tube in said predetermined orientation.

14. A tubular shaft assembly comprising a plurality of elements each including a nonround axial opening having an odd number of regularly spaced lobes of less than 3.0 percent eccentricity and primarily defined by joined outwardly convex arcs of varying radii, said elements being secured in fixed orientation and spacing, with said openings axially aligned, on a hollow tube expanded into interference engagement with all the element openings.

15. A tubular shaft assembly as in claim 14 wherein said openings as primarily defined are formed with a substantially constant apparent diameter dimension at all angular positions.

16. A tubular shaft assembly as in claim 15 wherein said shaft is made from a high strength low allow specification mild steel having a relatively low yield point but which is subject to substantial work hardening after yielding.

17. A tubular shaft assembly as in claim 14 wherein said openings as primarily defined are trilobed and formed with a substantially constant apparent diameter dimension at all angular positions.

18. A tubular shaft assembly as in claim 17 wherein the periphery of each of said openings as primarily defined has an eccentricity of from 0.4–1.5 percent of said apparent diameter of the opening.

19. A tubular shaft assembly as in claim 18 wherein said eccentricity is substantially 0.5 percent.

20. A tubular shaft assembly as in claim 17 wherein said lobes include at their ends at least one longitudinal serration of minimal radial extent, said tube being expanded into intimate contact with said at least one serration.

21. A tubular shaft assembly as in claim 20 wherein the periphery of each of said openings as primarily defined has an eccentricity of from 0.4–1.5 percent of said apparent diameter of the opening.

22. A tubular shaft assembly as in claim 21 wherein said eccentricity is substantially 0.5 percent.

23. A tubular shaft assembly as in claim 22 wherein said shaft is made from a high strength low alloy specification mild steel having a relatively low yield point but which is subject to substantial work hardening after yielding.

24. A tubular shaft assembly comprising a plurality of elements each including a nonround axial opening having an odd number of regularly spaced lobes of minimal eccentricity and secured in predetermined fixed orientation and spacing, with said openings axially aligned, on a hollow tube expanded into interference engagement with all the element openings, wherein said lobes include at their ends at least one longitudinal serration of minimal radial extent, said tube being expanded into intimate contact with said at least one serration.

25. A tubular shaft assembly as in claim 24 wherein said serration extends radially inward from the periphery of its lobe.

26. A tubular shaft assembly comprising a plurality of elements each including a nonround axial opening having an odd number of regularly spaced lobes of less than 3.0 percent eccentricity and primarily defined by joined outwardly convex arcs of varying radii, said elements being secured in fixed orientation and spacing, with said openings axially aligned, on a hollow tube mechanically expanded into interference engagement with all the element openings while forming within the tube a uniform smooth sided interior cross-sectional configuration and having portions of the tube exterior between the elements expanded diametrically beyond the element openings to secure the elements permanently onto the tube in said fixed orientation.

* * * * *